United States Patent [19]

Blatchford et al.

[11] Patent Number: 5,384,840
[45] Date of Patent: Jan. 24, 1995

[54] TELECOMMUNICATIONS SYSTEM SS7 SIGNALING INTERFACE WITH SIGNAL TRANSFER CAPABILITY

[75] Inventors: Jo Ann Blatchford, Middletown; Pamela L. DeFazio, Eatontown; Joel K. Young, Middletown, all of N.J.

[73] Assignee: AT&T Corp., Murray Hill, N.J.

[21] Appl. No.: 958,839

[22] Filed: Oct. 9, 1992

[51] Int. Cl.⁶ .............................................. H04M 7/00
[52] U.S. Cl. ..................................... 379/229; 379/221; 379/230
[58] Field of Search ............... 379/201, 207, 229, 230, 379/219, 220, 221

[56] References Cited
U.S. PATENT DOCUMENTS 5,282,244  1/1994  Fuller et al. ...................... 379/230

Primary Examiner—James L. Dwyer
Assistant Examiner—Harry S. Hong
Attorney, Agent, or Firm—Ronald D. Slusky; Kenneth M. Brown

[57] ABSTRACT

Network elements in a telecommunications network, such as toll switches, databases and the like, are provided with redundant SS7 signaling interfaces based on different software designs. At least one of the interfaces, referred to as a network endpoint signaling transfer point, or NESTP, is loosely coupled to its host and has signaling transfer point (STP) capabilities. In a routing table within the NESTP, a plurality of prioritized route lists are provided for at least some destinations, the list that is used to route a particular message to such a destination being a function of the route by which that message arrived at the NESTP.

7 Claims, 7 Drawing Sheets

FIG. 6

| DESTINATION ELEMENT | PRIOR ELEMENT | ROUTES AVAILABLE (PRIORITIZED) | | | |
|---|---|---|---|---|---|
| | | ROUTE 1 | ROUTE 2 | ROUTE 3 | ROUTE 4 |
| A | X | E | F | | |
| A | Y | F | H | I | |
| A | Z | K | E | F | |
| B | X | H | | L | |
| B | Z | I | J | L | |
| C | Y | G | F | | |
| C | Z | G | | | |
| C | W | G | F | L | |
| D | – | E | G | H | I |

FIG. 7

| DESTINATION AVAILABLE VIA NESTP | NESTP CONGESTED | NESTP LINKS CONGESTED | DESTINATION AVAILABLE VIA CNI | CNI CONGESTED | CNI LINKS CONGESTED | INTERFACE TO USE |
|---|---|---|---|---|---|---|
| Y | N | N | – | – | – | NESTP |
| Y | Y | – | Y | N | N | CNI |
| Y | N | Y | Y | N | N | CNI |
| Y | N | Y | Y | Y | Y | NESTP |
| Y | Y | – | Y | Y | – | NESTP |
| Y | N | Y | N | – | – | NESTP |
| Y | Y | – | Y | – | – | NESTP |
| Y | Y | – | N | N | – | NESTP |
| N | – | – | Y | – | – | CNI |
| N | – | – | N | – | – | TERMINATE |
| N | – | – | Y | Y | – | CNI |

TELECOMMUNICATIONS SYSTEM SS7 SIGNALING INTERFACE WITH SIGNAL TRANSFER CAPABILITY

BACKGROUND OF THE INVENTION

The present invention relates to signaling within telecommunications networks.

State-of-the-art telecommunications networks actually comprise two logical networks. The first, referred to herein as the "transport" network, is a network which carries voice, data and other subscriber-originated signals between communication endpoints. The second is a signaling network over which various network elements communicate signaling messages to one another in order to control the operation of the transport network. Those elements include, for example, transport network switches, various databases deployed within the network, and signaling transfer points (STPs), which route the signaling messages among the other elements. Thus, for example, messages transmitted over the signaling network are used to set up and tear down circuits interconnecting calling and called locations. They are also used to access, and obtain information from, such databases as calling card databases and databases which contain information about how to route "800" and other special service telephone calls.

Within the United States, the current standard for network signaling is so-called SS7 signaling, as defined in the ANSI standard entitled "American National Standard for Telecommunications—Signaling System Number 7," Nos. T1.110 through T1.116, hereby incorporated by reference. Although initially used only within interexchange carder (IXC) networks, such as the AT&T network, SS7 signaling facilities are now being rapidly deployed by the local exchange carriers (LECs), such as New Jersey Bell, both to interconnect elements within their own networks and to interconnect their networks with those of the IXCs. Indeed, the ability of the LECs to support such upcoming network capabilities as so-called "800 number portability" is dependent on such deployment of SS7 signaling facilities.

SUMMARY OF THE INVENTION

In accordance with the present invention, the signal transfer functionality, heretofore provided by stand-alone STPs, is integrated into the SS7 signaling interfaces which serve the non-STP network elements. The integrated structure, providing both signaling interface and STP-like capabilities, is herein referred to as a "network element STP," or NESTP.

A particular advantage provided by the invention is that it enables more economical deployment of an SS7 network in that messages can be routed from one network element to another with fewer "hops" between network elements than in the past without having to expand, for example, the capacities of the STPs or the number of links. Thus an SS7 message can be communicated directly between at least certain network elements (actually, their associated NESTPs) without having to be switched by any intermediate stand-alone STP. Moreover, in situations where a message currently needs to be routed through two stand-alone STPs, the invention allows one to suffice. In accordance with a feature of the invention, the NESTP can also serve as a "via" between two NESTPs and/or stand-alone STPs, thereby introducing additional switching capacity into the overall SS7 network.

Another advantage provided by the invention is that the reduction in the number of hops between network elements results in a reduction in the time required to set up a call—referred to as the call set-up delay. This will become increasingly important as the offering of increasingly advanced and complex network features results in an increasing number of messages required to set up a call.

BRIEF DESCRIPTION OF THE DRAWING

FIG. 6 shows a routing table stored within and used by the NESTP; and

FIG. 7 is a table showing how outgoing SS7 traffic from the toll switch is divided between the CNI ring and NESTP under conditions of congestion.

DETAILED DESCRIPTION

Figure 1:
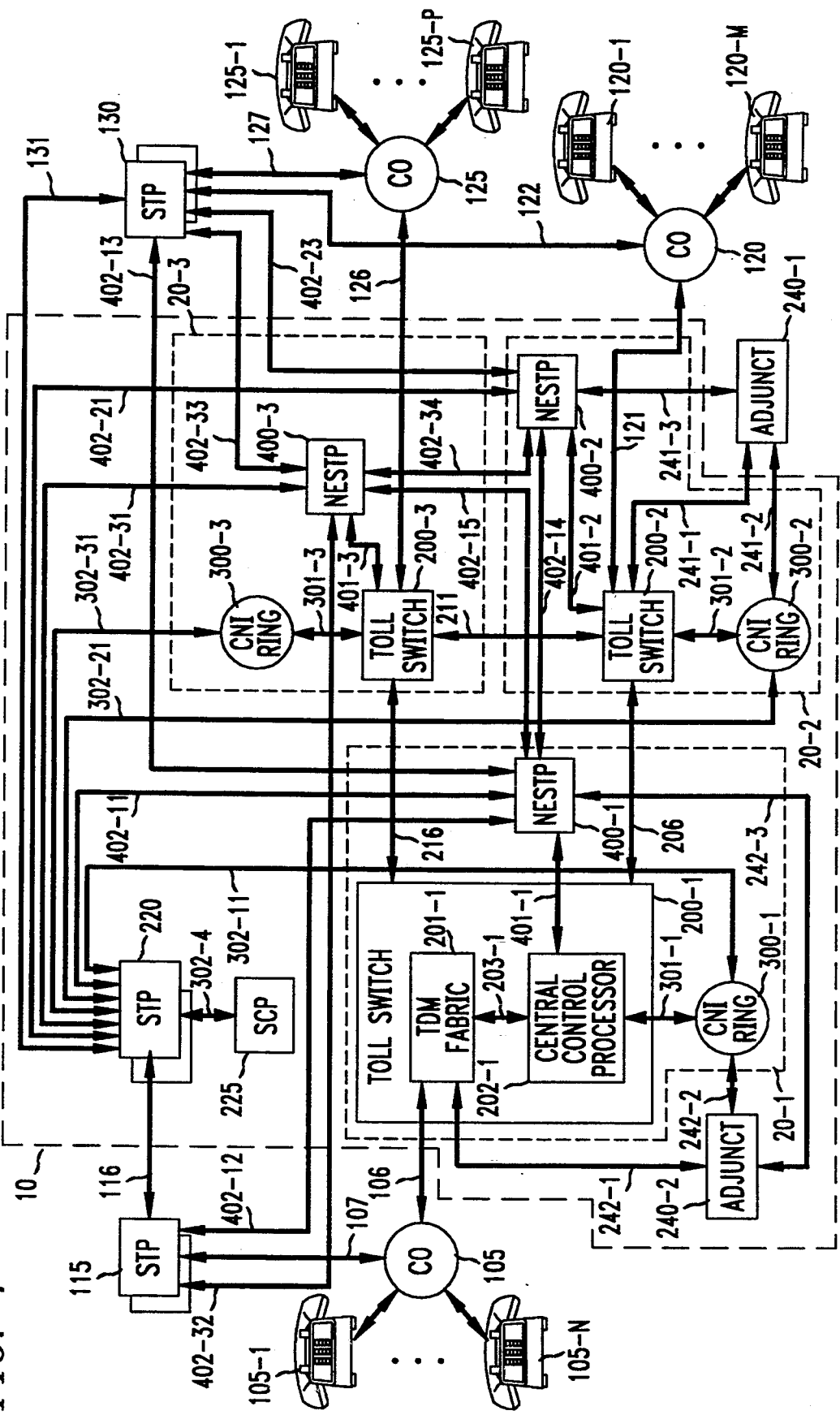
FIG. 1 is a block diagram of a telecommunications network which includes network element signaling transfer points, or NESTPs, embodying the principles of the invention.

FIG. 1 shows a telecommunications network in which the invention is implemented. The network includes an interexchange carrier (IXC) network 10 that provides services for subscribers, such as the subscribers associated with station sets 105-1 through 105-N; 120-1 through 120-M; and 125-1 through 125-P. More specifically, network 10 includes a plurality of toll switch complexes, three of which are shown in the FIG.—namely complexes 20-1, 20-2 and 20-3, which are interconnected via interoffice trunks 206, 211 and 216. A toll switch complex typically serves a number of local exchange carder (LEG) central offices (COs), three of which are shown in the FIG., these being central offices 105, 120 and 125. Central office 105 (120, 125), in particular, serves the aforementioned station sets 105-1 through 105-N (120-1 through 120-M, 125-1 through 125-P). Voice paths 106, 121 and 126 connect central offices 105, 120 and 125 to switch complexes 20-1, 20-2 and 20-3, respectively.

As will be described in further detail hereinbelow, SS7 signaling between central office 105 and IXC network 10 is carded out by way of link 107 and signal transfer point (STP) 115 connecting to STP 220 within the network via link 116. Similarly, SS7 signaling between central offices 120 and 125 and IXC network 10 is carded out by way of links 122 and 127 and STP 130 also connecting to STP 220, via link 131. In general, network 10 will have a number of STPs and STP 130 could, alteratively, be connected to an STP other than STP 220. Each of the STPs is, in actuality, a pair of STP units. This provides each STP installation with load-sharing and backup capabilities. Thus the links shown in FIG. 1 as being connected to an STP are, in actuality, divided between the two STP units of an STP pair.

Also shown in FIG. 1 is an adjunct 240-1 which is illustratively a PBX located on a subscriber's premises. Adjunct 240-1 is interconnected with network 10 via ISDN primary rate interface, or PRI, signaling links. In particular, the B channels 241-1 and the D channels 241-2 and 241-3 extend to switch complex 20-2. Another adjunct 240-2 is a part of network 10 itself and may be, for example, a voice interactive system which may be used, for example, to present voice announcements to callers and to "collect" information provided by subscribers via touch-tone entry or voice recognition. Adjunct 240-2 is interconnected with switch complex 20-1 via ISDN PRI signaling links, the B channels being designated 242-1 and the D channels, 242-2 and 242-3. Network 10 further includes a "signaling control point," or SCP, 225. The latter is, in essence, a database, to which queries are directed from within network 10 to obtain, for example, routing information for "800" calls and authorization codes for virtual private network (VPN)-type calling.

Each of the toll switch complexes comprises three components—a "host" toll switch and two SS7 signaling interfaces. Toll switch complex 20-1, in particular, includes toll switch 200-1 serving as host. One of the two SS7 signaling interfaces is common network interface (CNI) ring 300-1 described, for example, in U.S. Pat. No. 4,752,924 issued Jun. 21, 1988 to J. W. Darnell et al. The other SS7 signaling interface is network element STP-hereinafter NESTP—400-1 described in detail hereinbelow. Toll switch 200-1, in turn, includes time-division-multiplexed (TDM) fabric 201-1 and central control processor 202-1, which are interconnected via a bus interface 203-1. Central control processor 202-1 connects to CNI ting 300-1 via path 301-1. Although not explicitly shown in the FIG., path 301-1 illustratively includes an intermediary processor which controls the passage of information between the processor and the CNI ring. Central control processor 202-1 connects to NESTP 400-1 via path 401-1. There is no intermediary processor here. Rather, well-defined protocol rules (e.g., X.25) are used to control the passage of information between the processor and the NESTP.

Toll switch complexes 20-2 and 20-3 are configured similarly. In particular, complex 20-2 (20-3) includes toll switch 200-2 (200-3) serving as host for two SS7 signaling interfaces—CNI ting 300-2 (300-3) and NESTP 400-2 (400-3). Internally, toll switch 200-2 (200-3) is substantially identical to toll switch 200-1 and connects to CNI ting 300-2 (300-3) via path 301-2 (301-3), and to NESTP 400-2 (400-3) via path 401-2 (401-3). SCP 225 includes a single SS7 signaling interface—illustratively a CNI ring.

SS7 signaling among various ones of the network elements just described is provided over a number of SS7 links. In particular, CNI ring 300-1 has an SS7 connection to STP 220 via link 302-11. Similar SS7 connections are provided for CNI rings 300-2 and 300-3 via links 302-21 and 302-31, respectively. NESTP 400-1 is connected to STPs 220, 115, and 130 via links 402-11, 402-12 and 402-13. Moreover, with one exception, similar connections are provided for NESTPs 400-2 and 400-3 via links which follow an analogous numbering scheme. The exception is the absence of a link from NESTP 400-2 to STP 115. In this example, it is assumed that such a link is not economically justified given the typical traffic load between those two entities. Additionally, the NESTPs are interconnected via SS7 links 402-14, 402-15 and 402-34 in the manner shown. Finally, SCP 225 is connected to STP 220 via link 302-4.

In the operation of the network, the signaling carded out over the SS7 links is provided in order to allow two network elements to be correctly connected. In this process, the SS7 signaling may relate to such functionalities as circuit set-up and tear-down; and database (e.g., SCP) lookup in order to implement, for example, number translation for "800" service.

Thus, for example, consider a case in which a subscriber using telephone set 105-1 dials 1-800-225-5288. Central office 105, responsive to receipt of the dialed number, identifies the subscriber to the 800 number as being a subscriber of network 10, as opposed to some other IXC. Accordingly, central office 105 will initiate the establishment of a voice path to toll switch 200-1 over link 106. At the same time, it sends an SS7 message via link 107 to STP 115 which, in turn, sends the message to STP 220 of network 10 via link 116, that message specifying information about the call to be set up including, for example, information about the calling and the called (800) numbers. STP 220 thereupon takes steps to transfer the message to central control processor 202-1. In particular, it will be assumed for the moment that the only interface for each of the switch complexes 20-1, 20-2 and 20-3 to the SS7 network is via their respective CNI rings. Thus, the message from STP 220 is communicated to central control processor 202-1 via CNI ring 300-1 over link 302-11. Processor 202-1, recognizing the call as being an "800" call, initiates an SS7 message to SCP 225 out through CNI ring 300-1, link 302-11, STP 220 and link 302-4. SCP 225, over the reverse path, returns routing information back to processor 202-1 based on the 800 number that was dialed. Processor 202-1 uses that routing information to establish a connection from telephone set 105-1 to a telephone set associated with the dialed 800 number—in this example, telephone set 125-1. To this end, processor 202-1 initiates the establishing of a voice path from switch complex 20-1 to switch complex 20-3 via trunk 216 and, concomitantly, launches appropriate SS7 messaging to CNI ring 300-3 via CNI ring 300-1, link 302-11, STP 220 and link 302-31. At this point, the control processor within toll switch complex 20-3 initiates the establishing of a voice path via link 126 through to telephone set 125-1 via central office 125 and, concomitantly, launches appropriate SS7 messaging to central office 125 via CNI ring 300-3, link 302-31, STP 220, link 131, STP 130 and link 127. At the completion of the call, various SS7 messages are communicated among the various network elements in order to tear down the connection.

It will be appreciated that if, as just assumed, the only interface for each of the switch complexes 20-1, 20-2 and 20-3 to the SS7 network is via their respective CNI rings, the potential for a single point of failure exists. That is, failure of a CNI ring may well isolate its host from the rest of the network—the term "network" in this sense meaning the combined IXC, LEC (and possibly international) telecommunications networks. It is for this reason (among others) that each toll switch complex in the system of FIG. 1 includes a second SS7 signaling interface in the form of the NESTP. The NESTP in each toll switch complex a) has an interface with the central control processor which is, generally speaking, functionally comparable to that which is provided by the CNI ring, b) can signal to the same destinations, and c) like the CNI ring, has sufficient capacity to carry the entire expected SS7 signaling load. Accordingly, even if there is a catastrophic failure of one of the two SS7 signaling interfaces, the toll switch will not become isolated from the rest of the network. Moreover, even during routine operation, some percentage of the SS7 traffic will be carded by the NESTP. This ensures, for example, that both the CNI ring and the NESTP a) are operating properly, b) can be accessed by, and thus are under the control of, network management facilities and c) have common data that are at all times synchronized with one another.

The redundant SS7 signaling interfaces, the CNI ring and the NESTP—although identically processing messages following the SS7 standard—have substantially different software designs. By basing the redundant signaling interfaces on different software designs, thereby providing what we refer to as "software diversity," reliability is achieved in a dimension not heretofore appreciated. For example, a software error (bug) can remain undetected for a period of time in the CNI ring, only to surface under some particular unusual set of circumstances. If the NESTP were to be simply a clone of the CNI ring, the software error will, of course, surface in both signaling interfaces. And if the error is serious enough to cause a failure of one of those signaling interfaces, it will, of course, cause a failure in the other. Providing the SS7 signaling interfaces with software diversity precludes this from happening.

Figure 2:
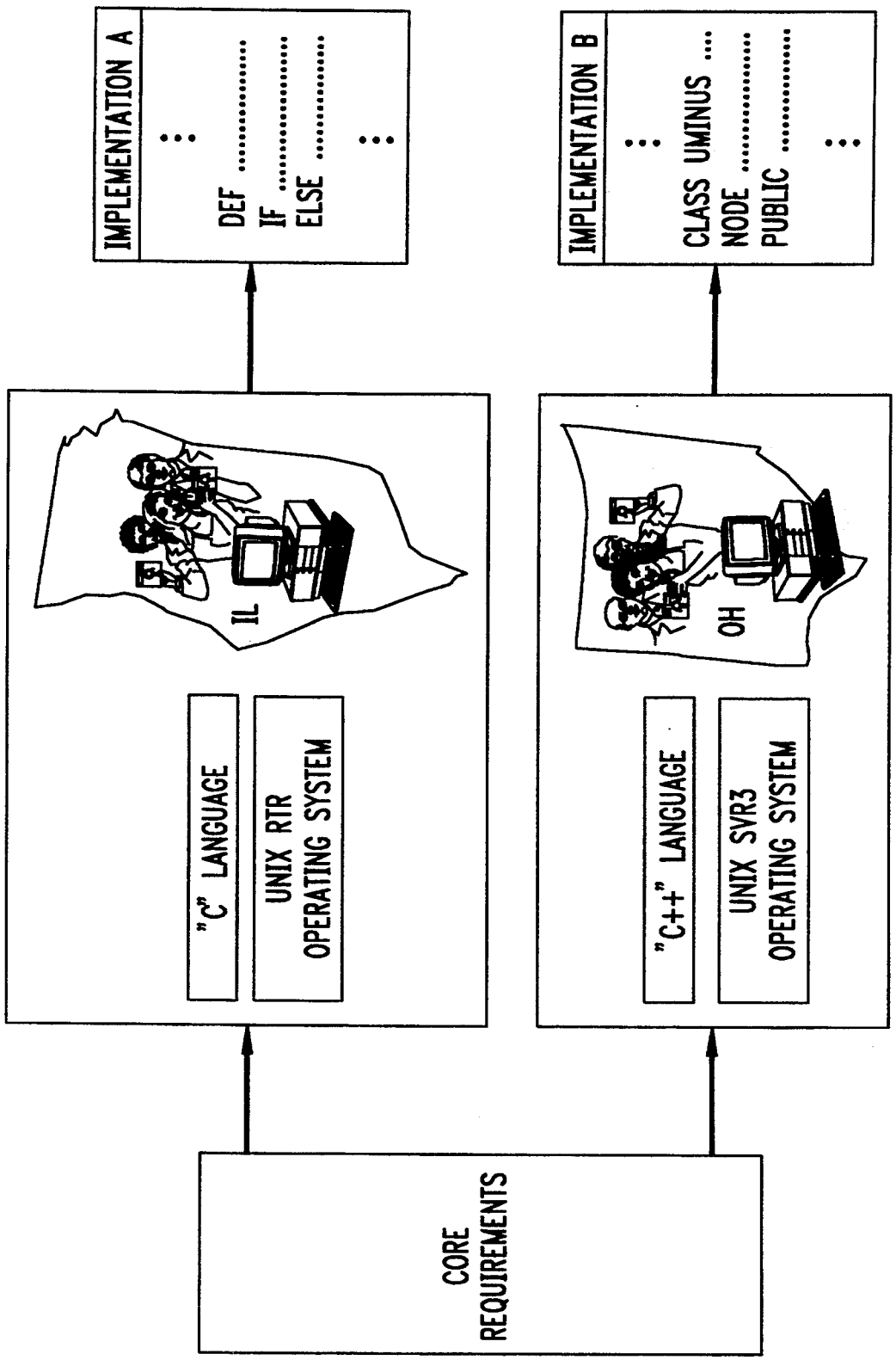
FIGS. 2 and 3 illustrate the concept SS7 signaling interface software diversity.
Figure 3:
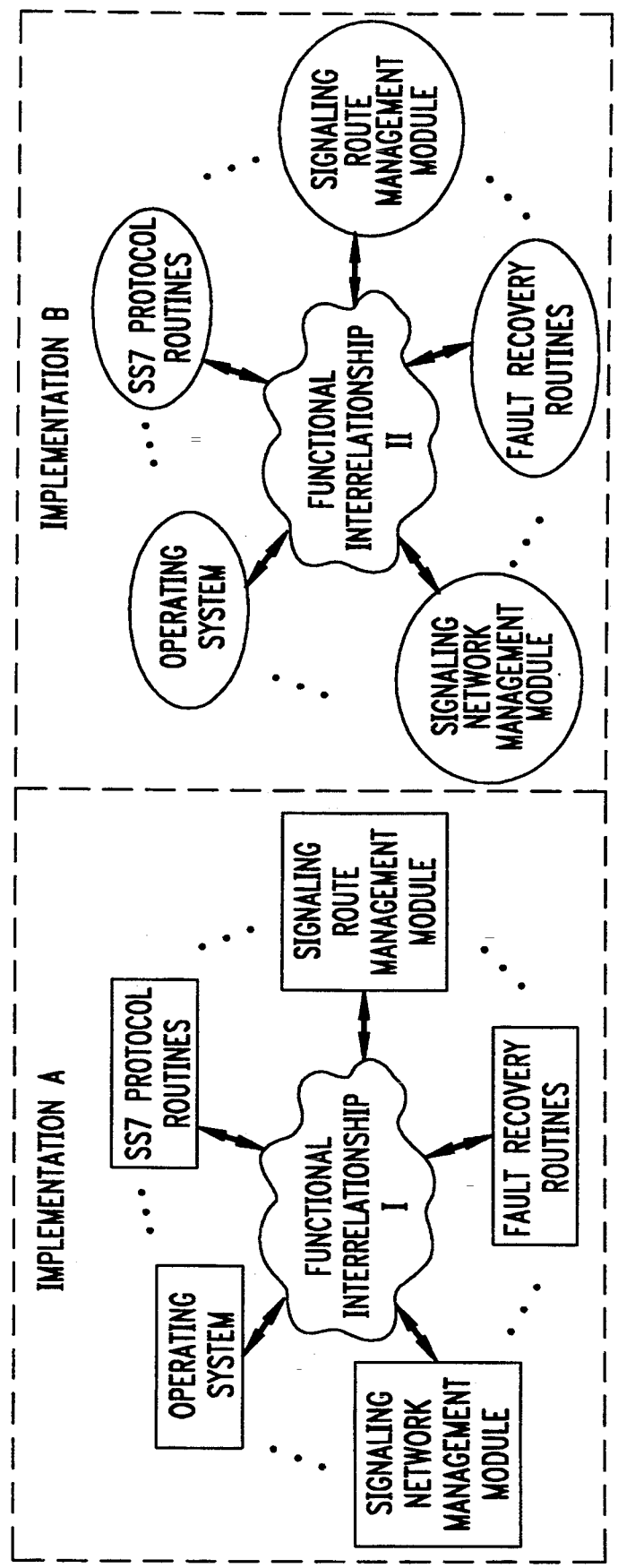

The notion of software diversity for two SS7 signaling interfaces is illustrated in two different ways in FIGS. 2 and 3. For generality, the two SS7 signaling interfaces will be referred to in this discussion as Implementation A and Implementation B. In the context of the present illustrative embodiment, the CNI ring can be thought of as Implementation A and the NESTP can be thought of as Implementation B.

As shown in FIG. 2, in particular, the designs for both Implementations A and B start out with a set of "requirements," which are typically developed by one or more so-called system engineers. The requirements we are concerned with here, and which are represented in the FIG., are the requirements which define those functionalities that are minimally required in order to function properly and effectively as an SS7 signaling interface. These we refer to herein as the "core" requirements. Beyond the core requirements, one or both of the SS7 signaling interfaces may have requirements that the other does not. This could be the case, for example, where Implementation A was designed and deployed in the network much earlier than Implementation B. In this case, it may have turned out that certain capabilities of Implementation A were not needed or were never used in actual operation of the network and thus are not desired for Implementation B. The requirements that define those capabilities would thus not be within the core requirements. Or, it may be desired that Implementation B be provided with capabilities beyond those provided by Implementation A. The requirements defining those capabilities for Implementation B would likewise not be within the core requirements because Implementation A never had those requirements. Requirements outside of the core requirements are not of concern here. What is of concern is that those requirements that are common to the two implementations are implemented differently.

In particular, the core requirements are used as the basis for creating a software architecture and, ultimately, the software itself that implements those requirements, those activities being referred to collectively as "programming." A certain degree of software diversity will be achieved even if the task of programming Implementation B is given to the same group of programmers that programmed Implementation A, as long as they are not allowed to slavishly copy their previous work or even use it as a model. The task is such that differences in the programming will necessarily occur when undertaken the second time, even by the same programmers. Many similarities are likely to remain, however, and the aforementioned latent "bug" may be carried forward into the second design.

A better approach, then, is to give the task of programming Implementation B to a different group of programmers who, again, are not allowed to use Implementation A as a model. Vast differences in the software architecture and the program code itself will now occur. Such is the nature of human creativity and the wide range of options that are inherent in the implementation of any computer programming task. Moreover, if the programmers work for a multi-location company, it may be possible to give the programming assignment for Implementation B to a programmer group that works in a geographically different location from the group that programmed Implementation A on the theory that different software design philosophies may prevail at locations where the programmers at the respective locations have had relatively little professional interaction over the years. In the example of FIG. 2, the two groups are respectively located in Illinois and Ohio. Software diversity can be further enhanced by, for example, using different operating systems and/or different programming languages for Implementations A and B. In the example of FIG. 2, Implementation A is programmed using the source code language "C" and uses the UNIX ® RTR operating system, while Implementation B is programmed using the source code language "C++ " and uses the UNIX ® SVR3 operating system.

Attention is also directed in FIG. 2 to the representative few lines of C language and C++ language source code implementing Implementations A and B, respectively. As seen from the FIG., they are different, symbolically making the point that a line-by-fine comparison of the source code for two SS7 signaling interface implementations developed using techniques such as those described above would show that there are vast differences between them.

Another way in which the concept of software diversity can be represented is shown in FIG. 3. It may be noted that, at some level of abstraction, Implementations A and B will have much in common. For example, each will have an operating system, SS7 protocol routines, a signaling route management module, fault recovery routines, a signaling network management module and, of course, many other software components. However, following the above-described and/or other techniques for achieving software diversity for SS7 signaling interfaces will result in modules and routines which, in each implementation, are a) different from one another, and b) have a different functional interaction. FIG. 3 illustrates this dimension of the software diversity concept by representing respective versions of the same functional module or set of routines enclosed by a rectangle for Implementation A and a circle for Implementation B. Moreover, the FIG. shows that the modules and routines have different functional interrelationships—denoted as Functional Interrelationship I and Functional Interrelationship II.

We turn, now, to another aspect of the design of SS7 signaling interfaces.

Conventionally, the SS7 signaling interface and its host are tightly coupled. By this is meant that one or both of these entities is dependent on one or more of the following aspects of the other entity: hardware and how it is used, specific data structures, or specific software routines. Indeed, there are advantages to having a tight coupling. For example, as noted above, designers have been able to achieve economies by building on top of resources already available in the host network element, such as data structures, and fault recovery and other routines. It is those and perhaps other advantages which apparently have led those in the an to consistently adopt a tight coupling approach in this application.

We have realized, however, that the conventional approach to the design of the signaling interface may be less than optimal. In particular, when the signaling interface and the host are tightly coupled, then subsequent changes desired to be made to either of them—such as to add new services and features—almost invariably results in the need to make changes to the other. Moreover, we have further recognized that there is a significant amount of inefficiency in customizing the design of each SS7 signaling interface to the characteristics of a particular network element host.

We overcome the limitations of the conventional approach by having the SS7 signaling interface and its host be loosely coupled, rather than tightly coupled. By "loosely coupled" it is meant that a) the SS7 signaling interface and its host do not share hardware but, rather, execute on independent hardware platforms; b) all communication between the SS7 signaling interface and its host is carried out via a well-defined message-based protocol; and c) the only dependencies between the SS7 signaling interface and its host are defined by that message-based protocol.

As to the first of these criteria, it will be appreciated that if there is any sharing of hardware, then a hardware change that is made for the purpose of updating or upgrading one of the two entities may be incompatible with the operation of the other entity, thereby requiring that changes be made to the other. However, as long as the SS7 signaling interface and its host execute on independent hardware platforms, this problem does not arise.

As to the second criterion, a message-based protocol, as the name implies, is one in which information is passed between communicating entities by embedding that information in messages which are communicated between them. A non-message-based protocol, by contrast, would allow information to be passed by, for example, using a memory mapping technique whereby the "receiving" entity accesses data in a memory which is administered and maintained by the "sending" entity. If it were desired for any reason to change the format, memory space allocations, or other aspects of how the "sending" entity stores such data, changes would have to be made in the "receiving" entity in order for it to be able to extract that data. Limiting information flow to a message-based protocol avoids this.

Finally, by ensuring, per the third criterion, that the two entities are independent of one another with the exception of the message-based protocol—such as by precluding the use of common software—there is again achieved the ability to make changes to one of the entities without giving rise to the possibility that such changes will give rise to the need to make changes to the other.

A further advantage of using loose coupling in this application is that, once designed, the SS7 signaling interface can be used, with very little or no modification, to serve a wide variety of later-designed network elements. Additionally, because NESTPs are only loosely coupled to their hosts, it is possible—indeed advantageous—to deploy them in a network on an as-needed basis.

Figure 4:
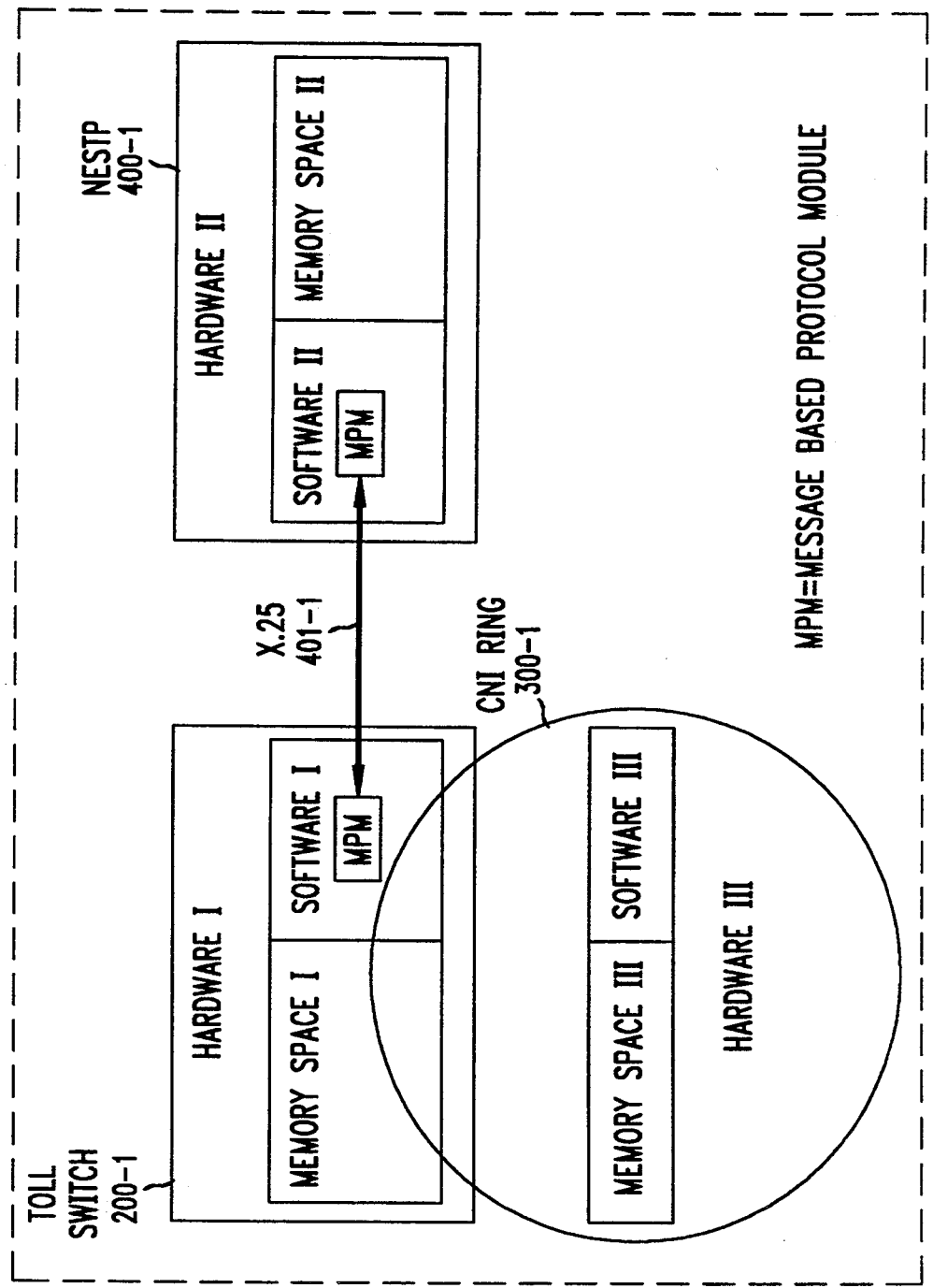
FIG. 4 provides a more detailed view of the toll switch NESTP and common network interface (CNI) ring shown in FIG. 1, illustrating the provision of loose coupling between the toll switch and the NESTP and of tight coupling between the toll switch and the CNI ring.

In the present illustrative embodiment, the CNI rings—which were designed for and deployed in, for example, the AT&T IXC network long prior to our discovery of the use of loose coupling for this application—are, at least in part, tightly coupled to their respective host toll switches. By contrast, the NESTPs disclosed herein are loosely coupled to their respective host toll switches. This distinction is shown explicitly in FIG. 4, which provides a more detailed view of toll switch 200-1, NESTP 400-1 and CNI ring 300-1. FIG. 4 shows that the toll switch and the NESTP do not share hardware but, rather, execute on independent hardware platforms, designated as Hardware I and Hardware II. For example, Hardware I is illustratively an AT&T 4ESS TM 1A processor system, while Hardware II is a physically separate hardware element, illustratively an NCR Star Server TM fault tolerant system. By contrast, CNI ring 300-1, although having some hardware which is unique to it, designated as Hardware III, also shares some of Hardware I, as depicted by the fact that the circle representing CNI ring 300-1 intersects a portion of Hardware I. An example of such shared hardware is AT&T's 3B20D processor system.

FIG. 4 further shows that all communication between the toll switch and the NESTP is carried out via a well-defined message-based X.25 protocol implemented by a software module designated as the "message-based protocol module (MPM)." However, the use of a common protocol is the only dependency between them. Note that the two entities have separate bodies of software—Software I and Software II—and have non-shared memories—Memory Space I and Memory Space II. By contrast, CNI ring 300-1, although having some software and memory space which are unique to it—Software III and Memory Space III—also shares some of Software I and Memory Space I, again as depicted by the fact that the circle representing CNI ring 300-1 intersects a portion of Software I and Memory Space I.

To this point, an NESTP has been described as providing the same basic, so-called "endpoint" functionality of a CNI ring. As such, it transmits and receives SS7 messages between its host and other network elements via an STP. In accordance with the invention, however, the NESTP is advantageously provided not only with endpoint functionality, but also with STP-type functionality. As such, it is able to a) support SS7 signaling between itself and other NESTPs directly, and b) act as would an STP in routing messages between endpoints.

A particular advantage of this approach is that it enables more economical deployment of an SS7 network in that messages can be routed from one network element to another with fewer "hops" between network elements than in the past without having to expand, for example, the capacities of the STPs or the number of links. Thus an SS7 message can be communicated directly between at least certain network elements (actually, their associated NESTPs) without having to be switched by any intermediate stand-alone STP. In the illustrative embodiment of FIG. 1, then, it will be recalled that the SS7 messaging required to establish a connection between station sets 105-1 and 125-1 involved, at one point, the transfer of a message between toll switch complexes 20-1 and 20-3 via STP 220. Since, however, NESTPs 400-1 and 400-3 have routing information comparable to that which, in the prior art, was maintained only within an STP (such as STP 220), NESTP 400-1 of switch complex 20-1 can effectuate a transfer of SS7 messages to NESTP 400-3 of switch complex 20-3 directly.

The elimination of "hops" is advantageous in that it results in a reduction in the time required to set up a call-referred to as the call set-up delay. This will become increasingly important as the offering of increasingly advanced and complex network features results in an increasing number of messages required to set up a call. Further advantages include an increase in the capacity of the SS7 network, as well as enhanced network reliability, resulting from the availability of diverse routing paths.

Furthermore, in accordance with a feature of the invention, an NESTP can also serve as a "via" between two other NESTPs and/or stand-alone STPs, thereby introducing additional switching capacity and path diversity into the overall SS7 network. In this context, it will be recalled that there is no direct SS7 link between NESTP 400-2 and STP 115. Thus, on the one hand, STP 220 is the preferred route for SS7 messages between STP 115 and toll switch complex 20-2. If, on the other hand, STP 220 should fail, an alternate route is available, that route comprising link 402-12, NESTP 400-1 acting in its "via" role, and link 402-14.

Figure 5:
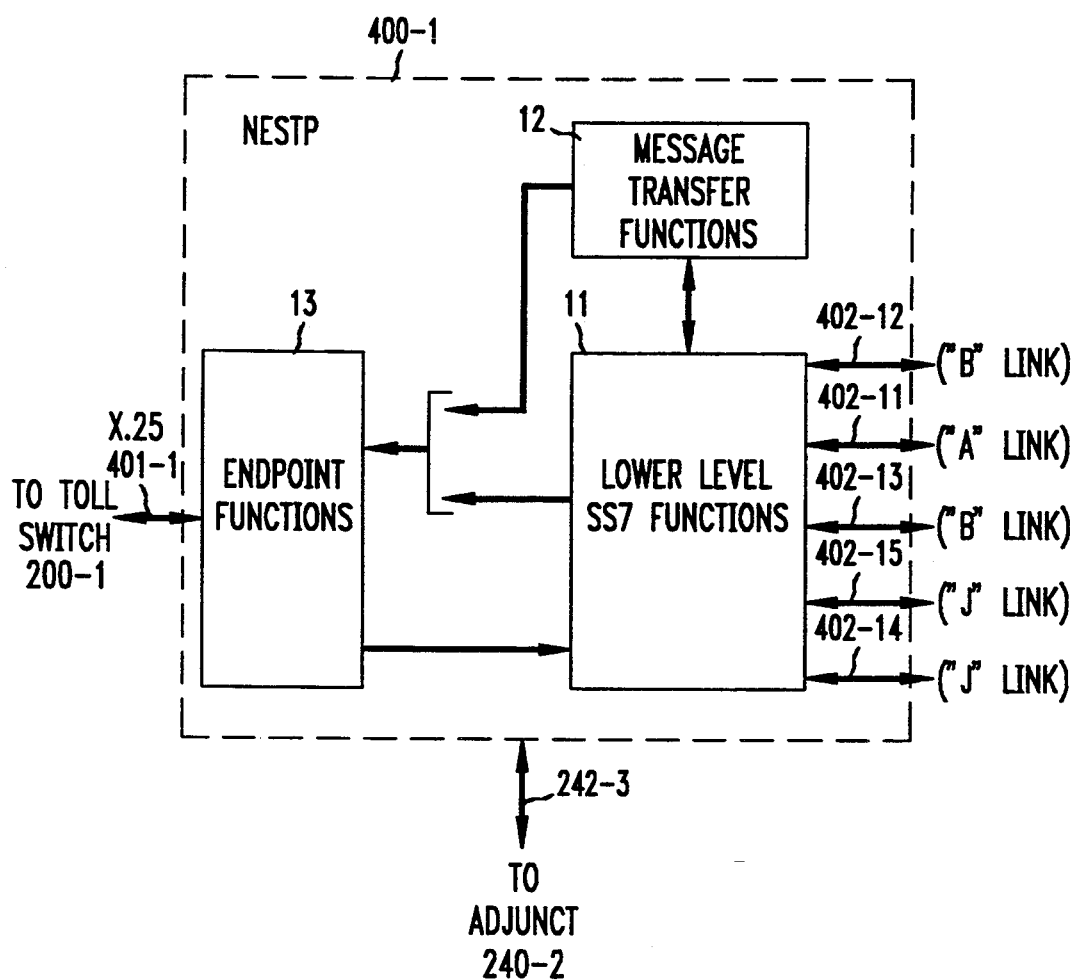
FIG. 5 provides a detailed view of the software structure of the NESTP.

More particularly, the software structure which allows an NESTP to provide the functionalities stated above is shown in FIG. 5 for, illustratively, NESTP 400-1. As shown, the software can be characterized as comprising three basic components—lower level SS7 functions 11, message transfer functions 12 and endpoint functions 13. (Although not explicitly shown in the FIG., NESTP 400-1 further includes an ISDN interface via which central processor 202-1 communicates with adjunct 240-2 via D channel 242-3.) Except for a few differences to be described, each of these components performs functions which are currently performed by either CNI rings, STPs or both. Thus a detailed description of these components is not required; those skilled in the art will be able to arrive at embodiments of these components based on the description which follows.

In particular, lower level SS7 functions 11 implements levels 1 and 2—the physical and data link levels, respectively—of the SS7 protocol. As such, it processes all SS7 messages incoming to the NESTP on any of the links 402-11 through 402-15. As is well known, such processing includes, for example, the conversion of incoming signal levels to logic, or "0" and "1" bit values, at the physical level and, at the data link level, the processing necessary to ensure that the messages are received error-free, such as by checking parity bit values and requesting retransmission of messages when errors are detected. Ultimately, the incoming SS7 application data contained within the message is then extracted therefrom and delivered to either message transfer functions 12 or endpoint functions 13, as will be described. As used herein the term "SS7 application data" means a) data which is ISDN User Part data or Transaction Capabilities Application Part data as specified in T1.113 and T1.114 of the above-cited ANSI standard, respectively, the former typically being used for call set-up transactions and the latter, typically, for database queries, and b) certain other information that may have been incorporated within the overall SS7 message, such as originating and destination SS7 network addresses, referred to as "point codes." In the opposite direction of transmission, lower level SS7 functions 11 receives outgoing SS7 application data from message transfer functions 12 and endpoint functions 13, "packages" that data in accordance with the level 1 and level 2 SS7 protocol requirements to create outgoing messages and applies those messages to the network over an appropriate one of links 402-11 through 402-15 identified by endpoint functions 13 and message transfer functions 12. (In actuality, each of links 402-11 through 402-15 is a set of links, or "link set," all of which extend to the same destination. The multiple links are provided simply to accommodate the level of traffic that occurs between NESTP 400-1 and the various entities to which it is connected. Lower level SS7 functions 11 equally distributes the traffic that is outgoing to a particular destination among the various links of the link set that connects NESTP 400-1 to that destination.)

Endpoint functions 13 provides an interface between the NESTP and central processor 202-1 (FIG. 1 ). In particular, it receives SS7 application data from either lower level SS7 functions 11, either directly or via message transfer functions 12. In either case, the protocol by which the application data is applied to endpoint functions 13 is exclusive of the SS7 Message Transfer Part (T1.111 of the above-cited ANSI standard) which defines levels 1, 2 and 3 of the SS7 protocol stack. (By contrast, a stand-along STP, when applying application data to another entity, always uses the SS7 Message Transfer Part in so doing.) That data is then communicated to central processor 202-1 over link 401-1 using the aforementioned well-defined message-based X.25 protocol. In the opposite direction of transmission, endpoint functions 13 receives the outgoing SS7 application data from central processor 202-1 which, again, is communicated over link 401-1 using the X.25 protocol. The outgoing SS7 application data is presented by endpoint functions 13 to lower level SS7 functions 11. Additionally, endpoint functions 13, in conventional fashion, identifies to lower level SS7 functions 11 the outgoing link on which the message is to be sent, based on information available to endpoint functions 13 as to link availability, traffic loads, etc. Lower level SS7 functions 11, as described above, thereupon incorporates the SS7 application data in an SS7 message and sends it out over the identified link.

The above-mentioned capability of the NESTP to provide STP-type functions is provided by message transfer functions 12. Indeed, message transfer functions 12 incorporates virtually all of the standard functionality of a stand-alone STP. Thus, message transfer functions 12, like a stand-alone STP, switches SS7 messages between pairs of elements in a predetermined manner which takes into account various fixed characteristics of the network, such as its topology, and various changing characteristics of the network, such as the operational status of particular links.

We consider, now, the various modes of operation of NESTP 400-1 in terms of the various relationships that it can have vis-a-vis other entities in the network.

In particular, the NESTP may act as an endpoint, i.e., like a CNI ring, communicating with a stand-alone STP, such as STP 220 over link 402-11. Links such as link 402-11 which interconnect an endpoint with a stand-alone STP are herein referred to as "A" links. In this case, SS7 application data originated by toll switch 200-1 is processed by endpoint functions 13 and lower level SS7 functions 11, as described above, and out on to the link 402-11. In the opposite direction of transmission, lower level SS7 functions 11 identifies the incoming message as having been received on an "A" link. Accordingly, it passes the SS7 application data directly to endpoint functions 13 from which it is, in turn, passed to the toll switch.

The NESTP may also act as an STP communicating with a stand-alone STP, such as STP 115 over link 402-12. Links such as link 402-12 which interconnect an NESTP acting as an STP with a stand-alone STP are herein referred to as "B" links. In its role as an STP, NESTP 400-1 may communicate with external endpoints such as NESTP 400-2 in its role as signaling endpoint for toll switch 200-2. It may also communicate with its own endpoint functions, namely endpoint functions 13. For example, the incoming "B" link message from STP 115 may be addressed to either toll switch 200-1 or toll switch 200-2. Even if the message was addressed to the former, lower level SS7 functions 11-because the message was received on a "B" link and therefore needs to be treated in all respects like an STP-to-STP communication-passes the SS7 application data to message transfer functions 12.

If, indeed, the message is addressed to toll switch 200-1, message transfer functions 12 supplies the application data to endpoint functions 13. The latter processes the received data from this point on in just the same way that it processes data that it receives from lower level SS7 functions 11 as described earlier. If, on the other hand, the message is addressed to toll switch 202-1, message transfer functions 12 takes steps to forward the application data contained in that message to toll switch 202-1 over a selected one of whatever routes may be available. In this case, the most direct route is via link 402-14 which extends directly to NESTP 400-2 within toll switch complex 20-2. Accordingly, message transfer functions 12 supplies the application data, along with information identifying the route, to lower level SS7 functions 11 which embeds the data in an SS7 message and transmits it over the appropriate link.

It will, of course, be appreciated that an NESTP does not provide STP-type functions vis-a-vis outgoing communications that originated from its own host. All such messaging is in the nature of transmission from an endpoint. As such, the processing of outgoing data in this case is accomplished in the manner described earlier relative to endpoint communications. Thus, although incoming data from a stand-alone STP and destined for toll switch 200-1 may pass through message transfer functions 12, outgoing data does not.

It should also be noted that, if an NESTP were connected into existing signaling networks, it would have only one of the two above-described types of relationship with a stand-alone STP. It should be noted, however, that this is not caused by an inherent limitation in the NESTP but rather is a stand-alone STP limitation. This is because the population of currently deployed STPs has been designed to expect that a particular entity with which it is communicating will communicate either as an endpoint or as an STP, but not both. In the future, however, a new generation of stand-alone STPs may be designed and deployed in the field which are capable of having both types of relationship.

An NESTP may also communicate with other NESTPs directly—the link between two NESTPs being referred to herein as a "J" link—thereby obviating the need for the services of an intermediate stand-alone STP.

We consider, first, the case in which NESTP 400-1 is the receiver of SS7 messages from, for example, NESTP 400-2. In particular, outgoing SS7 application data from, for example, toll switch 202-1 to toll switch 200-1 is processed by the endpoint functions and lower level SS7 functions of NESTP 400-2 and out over J link 402-14 to NESTP 400-1. The SS7 application data recovered by lower level SS7 functions 11 from messages received on a J link, such as link 402-14, is passed to message transfer functions 12 which, upon recognizing that the addressed entity is toll switch 200-1, passes the data on to endpoint functions 13. Alternatively, outgoing SS7 application data from, again, toll switch 200-2 may be destined for a different entity, such as STP 115. Since there is no direct link between toll switch 202-1 and STP 115, NESTP 400-1 is used as a "via." Here, the message from NESTP 402-1 still comes in over J link 402-14. Moreover, it is initially processed in the manner just described. However, upon determining from the destination point code that the message is destined for STP 115, message transfer functions 12 takes steps to forward that message to STP 115 over a selected one of whatever routes may be available. In this case, the most direct route is via link 402-12, the functionality being the same as that described earlier in connection with the operation of NESTP 400-2 serving as a via between these same two endpoints but in the opposite direction of transmission.

We consider, now, the case in which NESTP 400-1 communicates SS7 messages to NESTP 400-2. There are two possibilities. If the SS7 application data originated from toll switch 200-1, the SS7 application data is processed out on to J link 402-14 via endpoint functions 13 and lower level SS7 functions 11 in a manner already described in the context of NESTP 400-1 serving as an endpoint communicating with a stand-alone STP. On the other hand, messages that are to be communicated to NESTP 400-2 may have originated from other than toll switch 200-1. That is, they may have been communicated to NESTP 400-1 as an intermediate point in the signaling path. In this case, the application dam, upon being forwarded to message transfer functions 12 by lower level SS7 functions 11 will be, in turn, forwarded to NESTP 400-2 from message transfer functions 12 back out on to J link 402-14 via lower level SS7 functions 11.

As noted above, message transfer functions 12 incorporates virtually all of the standard functionality of a stand-alone STP. Thus, message transfer functions 12 not only provides the switching functionality described above, but also such conventional STP-type functions as signaling network management, signaling route management and routing. Those conventional functions are, as in the case of a stand-alone STP, provided with respect to entities which are external to the NESTP, such as the status of various links and various network elements. Additionally, however, message transfer functions 12 provides many of these same functions, as appropriate, vis-a-vis its own local endpoint functions 13.

With respect to routing functionality of message transfer functions in particular, attention is directed to FIG. 6, which shows a routing table maintained within message transfer functions 12. It is important that an STP—or, in this case, an entity providing STP-type functions—have the ability to communicate with other entities within the network over various different routes in order to account for network congestion, loss of facilities, etc. To this end, message transfer functions 12 maintains, for each destination in the network which can be reached therefrom, a prioritized list of routes for each such destination. FIG. 6 represents such a table, showing for each possible final destination A, B, C, . . . the prioritized list of routes—specifically the network entity to which the message is to be routed next. In accordance with a feature of the invention, two or more route lists may be maintained for particular destinations, the list that is used being a function of the route by which a message arrived at the NESTP—that route illustratively being simply the immediately prior network entity X, Y, Z, etc. For example, a message destined for central office 120 (FIG. 1) and received by NESTP 400-2 serving as a via may be routed to NESTP 400-3 (from which it will be routed to STP 130) if the message originated from STP 220 directly. On the other hand, the message may be routed through STP 130 directly if, although originating from STP 220, it was routed to NESTP 400-2 via NESTP 400-1. This originating-point-dependent routing is advantageous in that it gives the network designer/administrator flexibility in defining routings as a function of such criteria as anticipated traffic loads, the variability of those loads over time, facility costs, grades of service subscribed to, etc. Indeed, this approach is not limited to use in NESTPs. It could, for example, be implemented within stand-alone STPs as well. For some destinations, such as destination D in FIG. 6, the same route list is used, irrespective of the prior route.

It may also be noted that, as noted earlier, information about routes to various destinations are also maintained, and used, by endpoint functions 13. In general, the table in which that information is stored will be a different table, with different data, than the table used by message transfer functions 12 as just described.

FIG. 7 is a table showing how outgoing SS7 traffic from a toll switch could be divided between the CNI ring and NESTP under conditions of congestion. When there is no congestion, outgoing SS7 traffic is divided between these two SS7 signaling interfaces in a predetermined fixed proportion for various destinations. Specifically, if there is a direct NESTP-to-NESTP link between two endpoints, more of the traffic between them will be routed via that link than via a stand-alone STP. When, however, particular links to a destination become congested and/or one or both of the SS7 signaling interfaces themselves become congested, a table such as the table of FIG. 7 is consulted in order to determine which signaling interface should be used, based on whether a route to the destination is available via the CNI ring and/or the NESTP, whether the CNI ring and/or the NESTP is congested and whether the links to the destination are congested. The table shows one particular case—labeled TERMINATE—in which the call is simply terminated because the destination cannot be gotten to via either SS7 signaling interface. This might occur if, for example, a natural disaster destroyed all links to that destination.

The foregoing merely illustrates the principles of the invention. Those skilled in the art will be able to devise numerous arrangements which, although not explicitly shown and described herein, embody those principles and are within their spirit and scope.

We claim:

1. A method for use in an SS7 signaling interface within a telecommunications network, said SS7 signaling interface having a host element associated therewith, said method comprising the steps of
receiving, over an incoming link from a particular originating element within said network, incoming SS7 messages addressed to different elements within said network,
applying, to said associated host element, the SS7 application data contained in each received incoming message for which said associated host element is the addressed element, said applying using a protocol which is exclusive of the SS7 message transfer part, and
applying, to selected SS7 signaling links connected to said interface, outgoing SS7 messages which contain SS7 application data contained in ones of the received incoming SS7 messages for which the addressed element is other than said associated host element.

2. The invention of claim 1 wherein in the first of said applying steps, the SS7 application data is applied to said associated element in a form which is other than the form of an SS7 message.

3. The invention of claim 2 wherein in the second of said applying steps, ones of said SS7 signaling links are selected as a joint function of the identities of said originating and addressed elements.

4. The invention of claim 1 comprising the further steps of
receiving, from said associated element, SS7 application data addressed to ones of said elements, and
applying, to selected ones of said SS7 signaling links, outgoing SS7 messages which contain that SS7 application data.

5. An SS7 signaling interface for use in a telecommunications network, said SS7 signaling interface having a host element associated therewith, said SS7 signaling interface comprising
lower level SS7 function means for receiving, over an incoming link from a particular originating element within said network, incoming SS7 messages addressed to different elements within said network, and for extracting the SS7 application data contained in each received incoming message,
message transfer means for obtaining, from said lower level SS7 function means, the extracted SS7 application data and an indication of the element to which said each received message was addressed; for applying, to selected SS7 signaling links connected to said SS7 signaling interface, outgoing SS7 messages which contain SS7 application data contained in ones of the received incoming SS7 messages for which the addressed element is other than said associated host element; and
endpoint function means for receiving, from said message transfer means, the SS7 application data contained in each received incoming message for which said associated host element is the addressed element and for applying that data to said associated host element using a protocol which is exclusive of the SS7 message transfer part.

6. The invention of claim 5 wherein the selection of an individual one of said SS7 signaling links to which an outgoing SS7 message is to be applied by said message transfer means is a joint function of the identity of said originating element and the identity of the element to which that message is addressed.

7. The invention of claim 5 wherein said network includes a plurality of stand-alone signaling transfer points (STPs) which switch SS7 messages between pairs of elements in a predetermined manner which takes into account various fixed and changing characteristics of said network, and wherein said obtaining and applying performed by said message transfer means is carded out in substantially that same predetermined manner.

* * * * *

UNITED STATES PATENT AND TRADEMARK OFFICE
CERTIFICATE OF CORRECTION

PATENT NO. : 5,384,840
DATED : Jan. 24, 1995
INVENTOR(S) : Jo Ann Blatchford, Pamela L. DeFazio, and Joel K. Young It is certified that error appears in the above-identified patent and that said Letters Patent is hereby corrected as shown below:

Column 16, line 6, "carded" should read —carried—

Signed and Sealed this

Twenty-sixth Day of March, 1996

Attest:

BRUCE LEHMAN

Attesting Officer

Commissioner of Patents and Trademarks